United States Patent [19]
Kershaw

[11] 3,809,961
[45] May 7, 1974

[54] ELECTRIC OUTLET SENTINEL

[75] Inventor: Thomas N. Kershaw, West Coxsackie, N.Y.

[73] Assignee: Albany International Corp., Albany, N.Y.

[22] Filed: May 25, 1972

[21] Appl. No.: 256,763

[52] U.S. Cl............... 317/18 B, 317/31, 317/48, 324/51, 340/255
[51] Int. Cl.............................................. H02h 3/20
[58] Field of Search...... 340/255; 324/51; 317/18 B, 317/18 D, 18 A, 18 C, 48, 31

[56] References Cited
UNITED STATES PATENTS

| | | | |
|---|---|---|---|
| 2,999,189 | 9/1961 | Gerrard | 317/18 B |
| 3,659,152 | 4/1972 | De Langis | 317/18 B |
| 3,426,342 | 2/1969 | De Langis | 317/18 B |
| 3,714,517 | 1/1973 | Stracek | 317/18 B |
| 2,747,154 | 5/1956 | Abrams | 324/51 |

Primary Examiner—James D. Trammell
Attorney, Agent, or Firm—Kane, Dalsimer, Kane, Sullivan and Kurucz

[57] ABSTRACT

A relay coil is connected across the hot and ground wires of a single phase three wire AC circuit for establishing a current flow through the ground wire when the ground is continuous. The coil senses the current and causes pairs of normally open relay contacts to close. Said pairs of contacts are connected in series with each of the wires of the AC circuit for connecting the circuit to a load. The contacts remain closed so long as the ground wire of the three wire AC circuit remains continuous and connected to ground. If a ground fault occurs, that is the ground wire of the circuit ceases to be connected to ground, the current through the coil ceases and the contacts open. Appropriate indicators are controlled by additional relay contacts or switches to indicate the existence or nonexistence of a ground fault. Should the polarity of the AC circuit be reversed, current will not flow through the coil and the contacts will remain open rendering the circuit inoperative.

1 Claim, 3 Drawing Figures

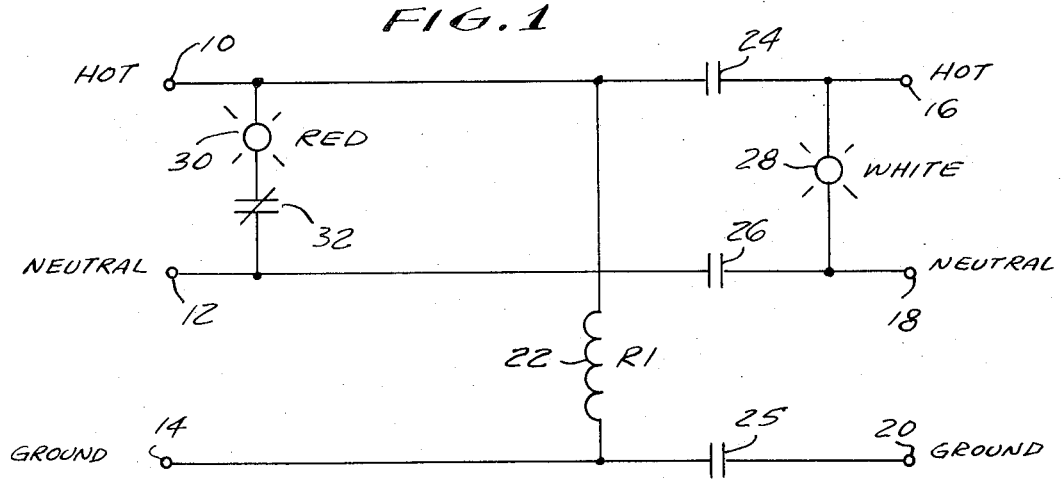
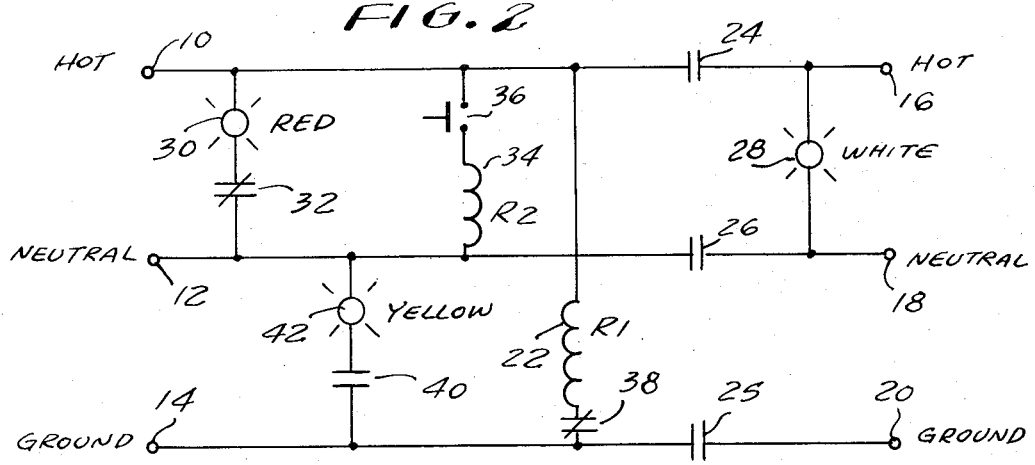
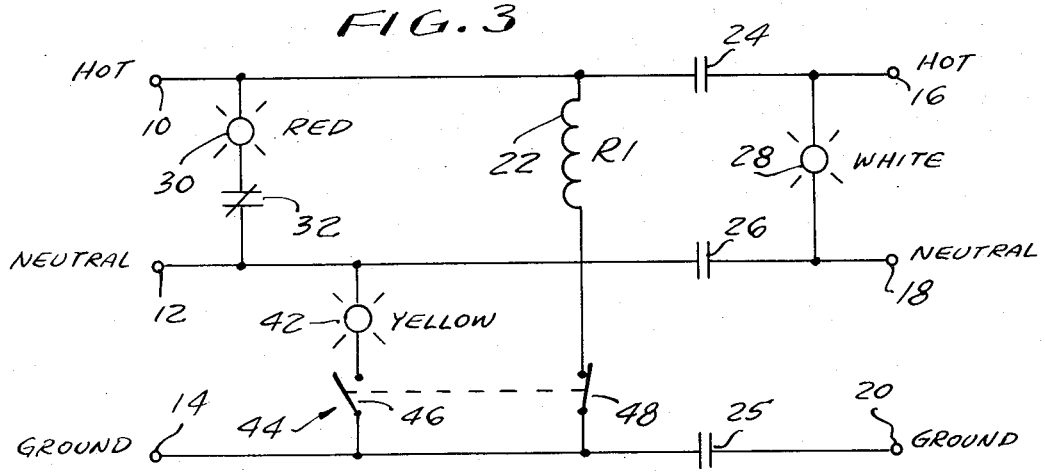

ELECTRIC OUTLET SENTINEL

BACKGROUND OF THE INVENTION

1. Field of the Invention

The present invention relates to circuit monitors and more particularly to such monitors that continuously monitor a circuit and immediately render a circuit inoperative upon detection of a ground fault or a reversal of source polarity.

2. Description of the Prior Art

Every year thousands of people are injured and hundreds are killed from electrical shocks resulting from defective electrical appliances. These shocks usually result from a defect within the appliance that causes the case or cover of the appliance to become electrically hot so that when a person touches the case, he receives a shock by acting as the path of least resistance to ground.

In an attempt to overcome this hazard, ground wires have been added to the standard single phase AC circuit outlet for the purpose of grounding the case of the appliance. If there is a short in the appliance, current is shorted to ground through the ground wire rather than through the body of a user. Another proposed solution is to provide double insulation on all appliances. On such appliances the outer surface of the case is doubly insulated, reducing the possibility of the user making contact with an electrically hot portion of the system should it become defective. Double insulation is presently being accomplished by providing an envelope of insulation around the primary insulation or by making the case from non-conductive material, thereby providing the second layer of insulation. This solution has not proven completely acceptable because of the resulting increase in cost of the appliances and because of the many manufacturing difficulties that have been experienced, as well as not really solving the initial problem of shock hazard due to insulation breakdown. The method only reduces the chance of contact as the insulation barrier breaks down.

Use of a third wire for a ground proved to be a good solution provided the ground wire was not defective and was actually connected to a ground. In many cases after an accident, it was discovered that the ground wire was not connected or had opened for one reason or another. This condition is generally called a ground fault, as distinguished from a short which results in an appliance when a wire is defective.

Heretofore, "ground fault" detectors have been complicated and expensive devices of the current monitoring type, the use of which was limited to industry where the high cost could be absorbed. These detectors sensed the current in both the hot and neutral wires and from these currents derived a differential current caused by an insulation breakdown. Thus, when a high differential current was detected, it was assumed a shock hazard existed. These devices provided a dynamic safety device; however, they did not check for a proper ground circuit or for proper circuit polarity.

Less expensive devices were not dynamic in nature and did not provide constant monitoring of an electrical circuit for immediate shutdown of the circuit should a ground fault occur. Most prior art devices were merely test devices that were used prior to operation of an appliance connected to the circuit. In such devices, a ground fault developing subsequent to the test could not be detected and the operator of the electrical device was subjected to severe electrical shock.

In the field of electronic instrumentation, a very unique problem existed. For reasons of safety, electronic instruments are fused only in the hot line; however, this becomes a hazard when the polarity of the source is reversed because in such cases, the instrument remains hot after the fuse has blown.

Having the fuse located in the hot line created another problem when the source was reversed. In most cases, a fuse blows because a short circuit or overload develops in the instrument. When the polarity is reversed and a short develops, a high current can flow through the ground wire because the fuse fails to blow. This current, if excessive, can burn out expensive instruments that have high replacement cost.

SUMMARY OF THE INVENTION

The present invention contemplates the use of a high resistance relay coil connected between the hot and ground wires of a single phase three wire AC circuit. The high resistance coil establishes a current of predetermined rate through the ground wire when the ground is continuous. The predetermined current energizes the relay for closing pairs of normally open relay contacts which are connected in series in each of the wires of the three wire circuit. The contacts connect the wires of the three wire circuit to a load which is energized only when the relay contacts are closed. Thus, the load is energized only when the ground connection is continuous and a current path is established through the relay coil. A series connection of a warning indicator and a pair of normally closed relay contacts is connected between the hot and neutral wires on the source side of the previously mentioned pairs of relay contacts to provide a warning if the relay is not energized when connected to a three wire AC circuit.

In another embodiment of the present invention, a second relay coil is connected in series with a momentary pushbutton switch and said series connection is connected across the hot and neutral wires of the three wire AC circuit. The relay controls a pair of normally closed contacts connected in series with the first relay coil and a set of normally open contacts connected in series with an indicator. Said series connected indicator and a pair of normally open contacts are connected between the neutral and ground wires. When the pushbutton switch is actuated, current flows through the second relay coil causing the second indicator lamp to be connected between the neutral and ground wires so that said lamp will provide a warning if the neutral and hot wires of the AC circuit have reversed polarity. If the polarity is proper, no current will flow through the second indicator and no warning will be given, thereby indicating the AC circuit is connected with the proper polarity.

In a third embodiment a double pole switch may be used in place of the second relay used in the second embodiment. One pole of the switch is used to connect the lamp between the neutral and ground wires while the other pole opens the wire connected to the first relay coil.

Thus, the present invention provides an initial warning if the polarity of a three wire AC circuit is incorrect or if any of the connecting wires are defective. The invention also provides an immediate warning if a ground fault is detected and renders the circuit inoperative if any circuit fault develops such as improper polarity or a ground fault.

The primary objective of the present invention is to provide a simplified and inexpensive device that renders a three wire AC circuit inoperative if a ground fault develops.

Another objective of the present invention is to provide an inexpensive ground fault indicator.

Another objective of the present invention is to provide a device for testing if the polarity of a three wire AC circuit is proper.

Another objective of the present invention is to provide a device for rendering a circuit inoperative should either a ground fault develop or the circuit polarity be improper.

The foregoing objectives and advantages of the invention will appear more fully hereinafter from a consideration of a detailed description which follows, taken together with the accompanying drawings, wherein three embodiments of the invention are illustrated by way of example. It is to be expressly understood, however, that the drawings are for illustrative purposes only and are not to be considered as defining the limits of the invention.

DESCRIPTION OF THE DRAWINGS

FIG. 1 is a schematic diagram of a first embodiment of the present invention.

FIG. 2 is a schematic diagram of a second embodiment of the present invention.

FIG. 3 is a schematic diagram of a third embodiment of the present invention.

DESCRIPTION OF THE INVENTION

Referring to FIG. 1, there is shown a schematic diagram of a circuit designed to be connected in series with a standard single phase three wire AC electrical source and a single phase load having a separate ground wire connected to a case. Terminals 10, 12 and 14 are adapted to be connected to the hot, neutral and ground terminals of a standard three wire AC electrical source. Terminals 16, 18 and 20 are adapted to be connected to the hot, neutral and ground wires of a standard three wire, single phase AC circuit load.

A high resistance coil 22 of a relay R1 is connected between the hot and ground wires for allowing a predetermined rate of current to flow through the ground wire and the coil.

The coil controls three pair of normally open relay contacts 24, 25 and 26 which are connected in series with the hot, ground and neutral wires respectively. An indicator 28, such as a white indicating lamp, is connected between the hot and neutral terminals 16 and 18 for indicating when the circuit is in proper operating condition. An indicator 30, such as a red indicating lamp, is connected in series with a normally closed pair of relay contacts 32, which are controlled by coil 22 of relay R1. Said series connection is connected between hot terminal 10 and neutral terminal 12.

When the source has the proper polarity and the ground wire is continuous, the predetermined rate of current is sufficient to energize relay R1, thereby causing contacts 24, 25 and 26 to close. Contacts 24, 25 and 26 connect the AC source to the load and also provide a voltage to indicator 28. Indicator 28 provides an indication that the source has the proper polarity and that the ground wire is continuous. When coil 22 is energized, contacts 32 open so that indicator 30 does not provide a warning indication.

In the event that a ground fault exists, coil 22 is not energized and contacts 24, 25 and 26 remain in the open condition, thus rendering the circuit inoperative while contacts 32 remain in the closed condition so that current flows through indicator 30 providing a warning that a ground fault exists. Should the hot and neutral terminals of the source be reversed, a zero potential is applied across coil 22 and the relay is not energized. Thus, if the source polarity is reversed, contacts 24, 25 and 26 remain in their normal open position rendering the circuit inoperative and contacts 32 remain closed so that indicator 30 provides a warning indication.

depending upon design parameters, various modification to the circuit may be made. Of course, the indicators could be eliminated if low cost is a major consideration. If the device is for use with low current appliances or instruments, relay contact 25 could be eliminated. However, in such cases, coil 22 must be of high resistance since the coil connects the hot wire to the ground wire which is normally connected to the case of the appliance. The resistance of the coil must be high enough to limit the current to a level that may safely pass through the body of a user since the case would become hot if a ground fault developed.

The invention also contemplates the use of a double pole double throw switch or relay for reversing polarity should an incorrect polarity be sensed.

Referring to FIG. 2, there is shown a modified embodiment of the circuit shown in FIG. 1, wherein there is provided additional test circuitry to determine if the polarity of the source is correct. A coil 34 of a relay R2 is connected in series with a momentary pushbutton switch 36. Said series connected switch and coil are connected between the hot and neutral wires of the circuit so that coil 34 is energized when switch 36 is actuated. Relay R2 has a normally closed pair of contacts 38 connected in series with coil 22, said series connection being connected between the hot wire and ground wire. Relay R2 also has a pair of normally open contacts 40 connected in series with an indicator 42, such as a yellow indicating lamp, said series connection being connected between terminals 12 and 14.

When switch 36 is actuated, current flows through coil 34 energizing relay R2 causing contacts 38 to open and contacts 40 to close. If the source is of the proper polarity, a zero potential is applied across indicator 42 so that no indication is provided; however, if the hot and neutral wires are reversed and the polarity is not correct, a potential is applied across indicator 42, which provides a warning that the polarity is incorrect.

The remainder of the circuit shown in FIG. 2 is identical to that shown in FIG. 1 and operates in an identical manner.

Referring to FIG. 3, there is shown a third embodiment of the present invention, wherein the second relay R2 of FIG. 2 is replaced by a double pole switch 44. Switch 44 has a pair of normally open contacts 46 connected in series with lamp 42 and a pair of normally closed contacts 48 connected in series with coil 22. The remainder of the circuit shown in FIG. 3 is identical to that shown in FIG. 1 and operates in an identical manner.

When switch 44 is actuated, relay R1 is de-energized because the normally closed contacts 48 open. The normally open contacts 46 close connecting lamp 42 between the neutral and ground wires. Should the polarity of the source be reversed, the lamp will be energized providing an indication of a reversed polarity.

Thus, the present invention provides a dynamic circuit monitor that is less complicated and less expensive than the devices heretofore provided. The device may be manufactured at a cost that will allow it to be used in both the home and small shop. The circuit has advantages over the prior art in that it is a dynamic device that continuously monitors the circuit and immediately renders the circuit inoperative should a ground fault develop. In addition thereto, the circuit also provides protection against a reversed polarity source and, in response thereto, renders the circuit inoperative. Another important feature of the present invention is that the circuit is failsafe. Should any of the components of the circuit fail to function properly, the circuit will remain in an inoperative condition and not provide electrical energy to a load.

Thus, the present invention provides an inexpensive circuit monitor for home and shop use and thereby fulfills a long felt need for such a safety device. The present invention could prevent many deaths and injuries resulting from electrical shocks received from small appliances used in homes and shops. The invention may also be used with electronic instruments to prevent their destruction should a short occur when the source polarity is reversed.

What is claimed is:

1. An electrical outlet monitor for a single phase three wire AC electrical source having a hot wire, a neutral wire and a ground wire, comprising:

current sensing means connected between the hot and ground wires for allowing a predetermined rate of current to flow through the ground wire and for sensing said current;

normally open first, second and third switch means connected in series respectively with said hot neutral and ground wires and responsive to the current sensing means for closing when current of at least the predetermined rate is sensed, whereby the outlet is rendered operative by the current flowing through the ground wire said current sensing means being connected to said hot and ground wires between the electrical source and said first and third switch means respectively;

indicator means; and a switch having a pair of normally closed contacts connected in series with the current sensing means and a pair of normally open contacts connected in series with the indicator means, said series connected indicator and normally open contacts connected between said neutral and said ground wires, so that when said switch is activated, the indicator provides a warning if the polarity of the AC source is reversed.

* * * * *